UNITED STATES PATENT OFFICE.

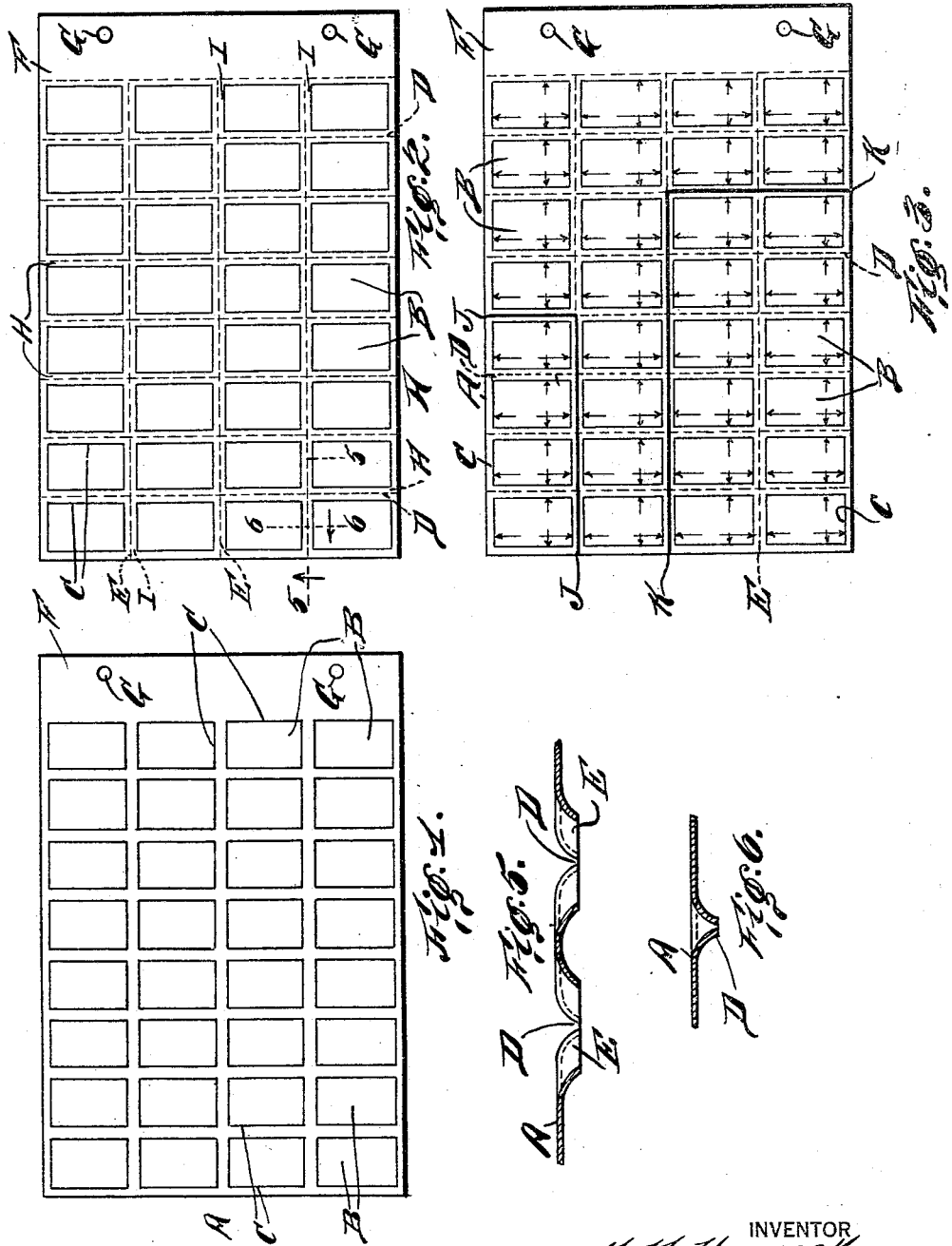

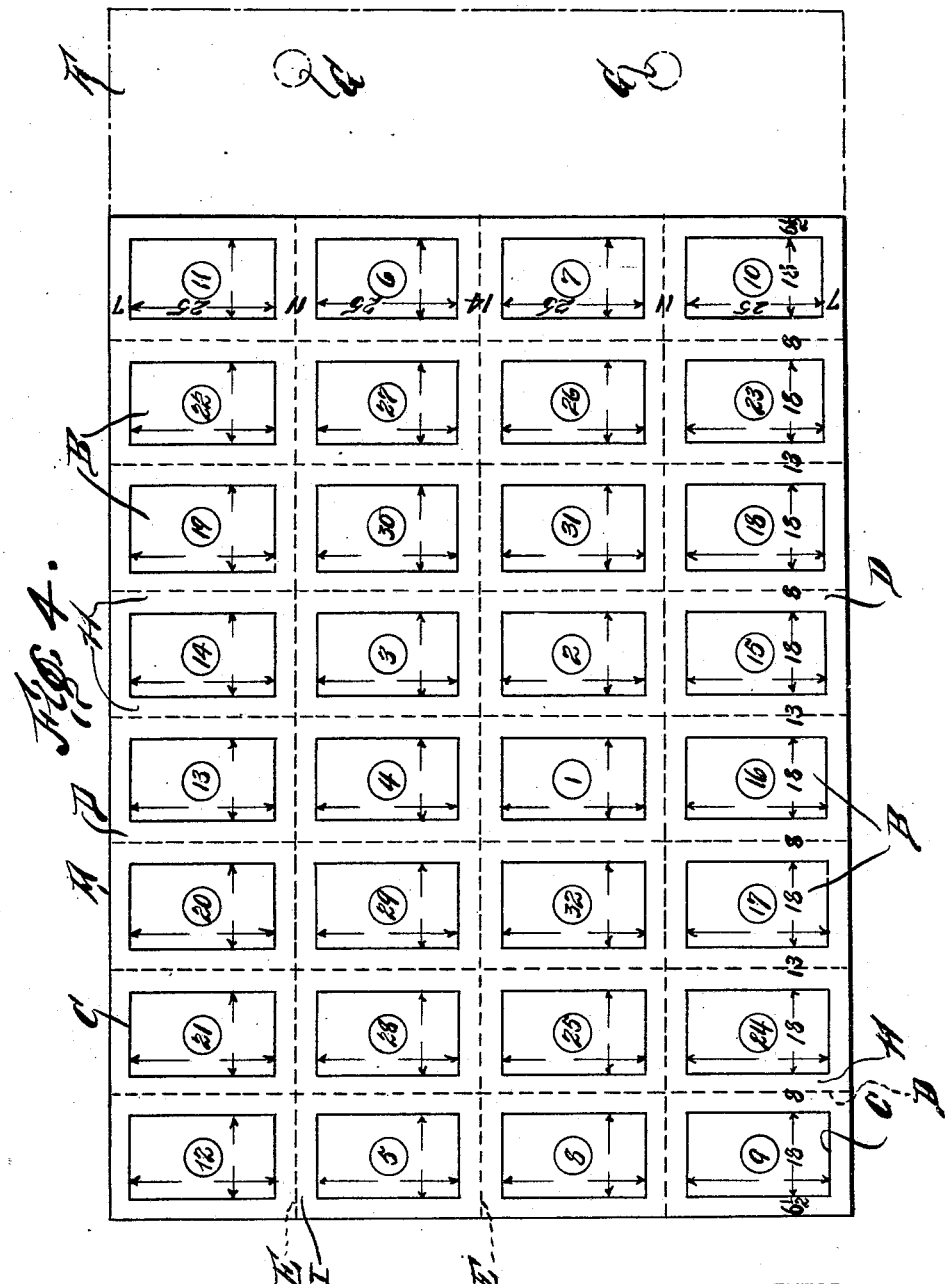

HARRY H. HANCOCK, OF SWAMPSCOTT, MASSACHUSETTS, ASSIGNOR OF ONE-HALF TO ARTHUR S. WEBSTER, OF HALIFAX, MASSACHUSETTS.

ART OF PRINTING.

1,297,841.  Specification of Letters Patent.  Patented Mar. 18, 1919.

Application filed May 24, 1918. Serial No. 236,274.

*To all whom it may concern:*

Be it known that I, HARRY H. HANCOCK, a citizen of the United States, residing at Swampscott, Massachusetts, have invented certain new and useful Improvements in the Art of Printing, of which the following is a clear, full and exact description.

This invention relates to improvements in the art of printing, and has reference more particularly to a method for use in lining up sheets for printing, and the method may be considered as incidental to the lining apparatus forming the subject-matter of my applications Serial Numbers 73,133 and 220,490, filed, respectively, January 20, 1916 and March 5, 1918. The said applications disclose means for lining up pages to be printed, no matter what the number of pages may be, the object being to do away with the tedious and time consuming work incidental to determining whether or not a page-proof has been properly printed. By means of said apparatus, the pages of a page-proof are so laid out on a sheet that the one who lays out the sheet in the apparatus can do so according to instructions received from the foreman, and the result will be a sheet lined up in accordance with such instructions. As a guide to the person who operates the apparatus to line-up according to instructions on said guide, under the present invention a miniature or small sized guide sheet is provided, which is so laid out and inscribed that the compositor can see at a glance the type measure to set the type; the make-up man the length to make up the pages; the stoneman the exact number of picas to place in the margins and gutters; the pressman the margin for both gripper and side gages of the press; and the line-up man can line up the sheets either before or after going to press, and the lines, markings, inscriptions, etc. on the miniature sheet will be subsequently placed on the large sheet lined up in such apparatus, and which may be the real guide to said classes of printers.

These being some of the general objects of the invention, one of the specific objects thereof is to provide a miniature or traveler sheet which follows the job from the first line of composition right through to the lining up and printing, so that everyone handling the job has positive and identical instructions, and all possible mistakes and running to the forman for instructions are eliminated. Another object of the invention is to provide a printed miniature guide sheet bearing suitable inscriptions, to indicate what the various printers in a shop are to do with a given job, whether the job has to be lined up in apparatus such as referred to or not.

These being among the objects of the invention, the same consists in the method herein described and the steps of which are included in the appended claims, reference being had to the accompanying drawings which are illustrative of the method, and in which Figure 1 is a plan view of a miniature sheet which has been printed with rectangularly outlined fields indicating pages;

Fig. 2 is a plan view showing the same sheet provided with intersecting weak lines or indentations or perforations which are outside the rectangular outlines;

Fig. 3 is a view similar to Fig. 2, the sheet bearing certain indicating arrows, and the heavier lines indicating portions of said sheet which may be cut or torn therefrom in different combinations of rectangular outlines;

Fig. 4 is an enlarged view similar to Fig. 2, and on which are certain indications and inscriptions to indicate certain measurements, it being assumed that the entire sheet is to be used in connection with the laying out of a larger sheet according thereto;

Fig. 5 is an enlarged section on the line 5—5 Fig. 2, the features shown being exaggerated to facilitate a clearer understanding; and Fig. 6 is an enlarged section transverse to Fig. 5, on the line 6—6 Fig. 2.

Referring to the drawings, a sheet A of flexible material, such as paper, is provided, said sheet being rectangular. Although sheets in book form are not a necessary part of the improved method herein described, preferably a large number of sheets are bound in book form in a loose-leaf binder. One surface of sheet A is provided with plane fields or spaces B surrounded by rectangularly arranged outlines C, to indicate pages, and the rectangular outlines extend in multiples of two in both directions of the sheet, that is, longitudinally and transversely, and all of the outlined fields B are of the same size as each other. These rectangular fields or figures represent on a reduced scale the sheet to be printed from multiples of type, plate or lithographic forms. Preferably, except as hereinafter specified, the rectangular fields or figures B are plain, and the outlines C are printed on the sheet. The described outlined fields are clearly shown in Fig. 1, from which it will be seen that they are symmetrically arranged upon the sheet, so that the same number of outlined rectangular fields is arranged in those rows which extend in the same direction with each other. Inasmuch as a page of printed matter is usually oblong, oblong outlined fields B have been shown in the drawings.

Referring to Fig. 2, the step in the method which preferably follows that of the printing of the oblong fields shown in Fig. 1, is illustrated, such step consisting in providing the printed or outlined surface of the sheet A with lines of weakness extending perpendicularly to the edges of the sheet, so that there will be lines of weakness D extending transversely of the sheet, and other lines of weakness E extending longitudinally of the sheet and intersecting the lines of weakness D. These lines of weakness in the sheet A may be provided in any suitable way, as by forming indentations or perforations therein. The drawings, particularly Figs. 5 and 6, indicate that the sheet has been indented in both directions by short spaced slits extending through the sheet. It will be observed that the lines of weakness D, E, do not traverse the outlined rectangular fields or figures B, C, but inasmuch as the said fields B, C, are separated, the said lines of weakness extend between the said fields, so that each outlined field B, C, is surrounded by rectangularly arranged lines of weakness which are spaced symmetrically around said outlined fields. It will be observed from Fig. 2 that the last line of weakness D to the right separates the sheet A proper from a tab or strip F from which the sheet proper may be torn or separated, said tab being provided with perforations G to adapt the sheet to be placed in a loose-leaf binder. The spaces between adjacent rows of the rectangularly outlined fields which extend in one direction are indicated by H, while those which extend in a direction at right angles to the spaces H are indicated at I. It will be seen, therefore, that the lines of weakness D extend along the transverse spaces H equidistantly from the adjacent outlined fields B, C, while the lines of weakness E extend similarly along the longitudinal spaces I, which separate the longitudinal rows of outlined fields or figures.

Having provided a sheet with outlines thereon, as shown, and lines of weakness therein, the next step in the method of procedure may be to utilize the entire sheet A after it has been torn from the tab or stub F, or portions of said sheet may be utilized as indicated by the heavy outlines in Fig. 3. If portions of the sheet are utilized as by tearing or separating parts of the sheet at J, J, or K, K, for instance, such portion will comprise separable units of the sheets in multiples of two; that is, J, J, indicates that four of the separable units may be removed from the sheet, a unit being understood to be a single piece bearing a single rectangular field which could be torn out along the lines of separation around that field, but a single piece is not torn out or removed. At K, K, it is indicated that two rows of outlined rectangular fields or figures may be removed from the sheet, each row containing six units. Of course, if desired in some connections, single units might be torn out or removed from the sheet, but inasmuch as the herein described method is to preferably obtain registration of a printed page at one side of a leaf with that at the other side of said leaf, multiples of two units or separable portions are removed from the sheet.

Of course the outlined surface of the sheet may be such that it can be written upon, and Fig. 3 shows the sheet in condition to be written upon, it being assumed that the fragments indicated in said figure are not removed. It will be seen that the outlined oblong figures or fields B are each provided with indicating arrows printed thereon, some of them extending longitudinally of the pages indicated by the fields, while others extend transversely. Preferably constructed and printed as above described, the sheet A is ready to receive inscriptions, these inscriptions being usually in the form of arabic numerals written upon the surface of the sheet, as shown in Fig. 4. Assuming that the entire sheet is to be used in making up a thirty-two page form, for example, the lay-out man or foreman ascertains what dimensions are required in the pages for the pamphlet or book eventually to be printed, and then places upon the miniature traveler or lay-out sheet A the necessary inscriptions. Assuming that the pages for the book to be printed call for the dimensions shown on Fig. 4, the lay-out man indicates on one or more of the rectangularly outlined fields or figures B the type measure to set the type. Assuming that such type measure is in pica dimensions, the number 18 will be placed in said outlined field. The number 25 placed in said outlined figure or field, or others, indicates the length to make up the pages.

These numbers 18 and 25 for example only, are both placed preferably on at least one of the outlined fields or figures B, say the one at the lower right-hand corner of the sheet, while longitudinally of the sheet on the other outlined figures the number 18 is repeated, while the number 25 is repeated on the outlined figures which run transversely along the right-hand end of the sheet. The numbers 7, 11, 14 and 11 which are written on the longitudinal spaces between the fields or figures B at the right-hand end of the sheet, and the numbers 6½ which are in the margins at the lower portion of the sheet and outside the lower row of fields or figures B, with the numbers 8, 13, 8, 13, 8, 13 and 8, indicate the exact number of pica to place in the margins and gutters of the form.

To explain more at length, the numbers 8 between the units of successive pairs, or which extend alternately between the units or the fields or figures B, indicate the dimension of the back margin for the pages of the printed book, while the numbers 13 which are twice 6½ and the numbers 6½, which alternate with the numbers 8, indicate the front margins to be provided for the book to be printed, except that if the back margin is indicated by 8, sufficient allowance should be made for trimming the pages and this is assumed to be 2½ pica for instance, so that when the book has been trimmed to that extent, the cut edges will be trimmed down to dimensions corresponding with the back margin indicated by the numbers 8. In a similar way, allowance for trimming is indicated transversely of the miniature sheet by the numbers 7, 11, 14 and 11 before mentioned, the numbers 7 and 14 indicating the tail margins, while the numbers 11 indicate the head margins, all said indications allowing for trim of the printed pages of the book. The indicating numbers mentioned have been given only by way of example, as for lithograph work, linear units of measurements are employed, while for printing from multiples of type or plates, either linear unit measurement may be used, or pica, nonpareil, or other unit of measurement familiar to the printer may be employed to indicate on the miniature sheet the dimensions which have been ascertained by the lay-out man and which he desires shall be followed up in the printing establishment by those who work on the job.

To those skilled in the art, it is obvious that the sheet shown in Fig. 4, or any portion of said sheet which is removed in multiples of two units, may represent, and in fact is a miniature signature of a book, the lines specifically designated lines of weakness, being in fact, lines indicating where the sheet may be severed or its units separated. Where a large number of pages are to be provided for, it is preferred to indicate on the miniature sheet how the larger sheets which are eventually printed are to be folded for the book, and to this end it is preferred to provide small circular outlines within the rectangularly arranged outlines C, and to inscribe within the circles the numbering for the pages.

Such a miniature sheet A furnishes a guide to the operator of the lining apparatus, such as shown in my aforesaid applications, whereby to line-up a large sheet to be printed full size, according to the dimensions indicated on the miniature sheet. When the compositor who has set up the type, the make-up man who has made up the length of the pages, and the stoneman who has placed the exact number of furniture elements, etc., in the margins and gutters, have properly done their work according to the instructions given on the miniature sheet, the sheet which has been lined up with the said lining apparatus should be exact, and if it shows any error in printing, it is known that there has been some trouble somewhere. However, with the use of such lining apparatus as referred to, it should be impossible to make any error if the directions contained on the miniature sheet have been followed.

The miniature sheet, such as described, is either attached to the large sheet or printed copy which has been made after the sheet for said copy has been lined up according to the directions on the miniature sheet, or, as is preferred, the miniature sheet is attached or pasted to the outside of the envelop which contains the copy and other facts about the job, and the same is filed away for future reference.

It is obvious that the method steps herein described need not be followed except as specified in the claims, but not necessarily in the order named, and the method is therefore susceptible of modification.

What I claim as new is:—

1. In the art of printing, the method herein described which consists in providing a sheet which is to represent on a reduced scale the sheet to be printed from multiples of type, plate or lithographic forms, providing a surface of said sheet with spaced rectangular outlines of similar dimensions and discontinuing the lines of said outlines at the spaces between said outlines, providing said sheet with separation indicating lines extending along said spaces perpendicularly to and intersecting other separating indicating lines extending along said spaces, so that each of said rectangular outlines is surrounded by rectangularly arranged separation indicating lines spaced symmetrically around said outlines, and placing inscriptions on said surface for specifically indicating; within said outlines the type measure to set the type and the length to make up the pages; between said rectangular outlines, the back and front margins and the head and tail margins; and the dimensions of the margins for both gripper and side gages.

2. In the art of printing, the method herein described which consists in providing a sheet which is to represent on a reduced scale the sheet to be printed from multiples of type, plate or lithographic forms, providing a surface of said sheet with rectangular outlines of similar dimensions and equidistantly spaced, and discontinuing the lines at the spaces between said outlines, providing said sheet with lines of weakness extending along said spaces perpendicularly to and intersecting other lines of weakness extending along said spaces, so that each of said rectangular outlines is surrounded by rectangularly arranged lines of weakness spaced symmetrically around said outlines, and placing inscriptions on said surface for specifically indicating; within said outlines, the type measure to set the type and the length to make up the pages; between said rectangular outlines, the back and front margins and the head and tail margins; and the dimensions of the margins for both gripper and side gages, and associating said sheet with the printed copy of which it is a miniature.

3. In the art of printing, the method herein described which consists in providing a sheet which is to represent on a reduced scale the sheet to be printed from multiples of type, plate or lithographic forms, providing a surface of said sheet with spaced rectangular outlines of similar dimensions and discontinuing the lines at the spaces between said outlines, providing said sheet with lines of weakness extending perpendicularly to and intersecting other lines of weakness extending along said spaces, so that each of said rectangular outlines is surrounded by rectangularly arranged lines of weakness spaced symmetrically around said outlines, tearing out a portion of said sheet along said lines of weakness in multiples of two units, and placing inscriptions on the removed portion of said sheet so as to indicate dimensions for the printed copy of which said portion is a miniature.

Signed at New York, N. Y. this 22nd day of May 1918.

HARRY H. HANCOCK.

Copies of this patent may be obtained for five cents each, by addressing the "Commissioner of Patents, Washington, D. C."